United States Patent
Chivilikhin et al.

(10) Patent No.: US 8,361,423 B2
(45) Date of Patent: Jan. 29, 2013

(54) EXHAUST GAS AFTER-TREATMENT DEVICE AND METHOD OF USE

(75) Inventors: Mikhail Sergeevich Chivilikhin, St. Petersburg (RU); Ameya Joshi, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 56 days.

(21) Appl. No.: 13/115,570

(22) Filed: May 25, 2011

(65) Prior Publication Data

US 2012/0301376 A1 Nov. 29, 2012

(51) Int. Cl.
*B01D 53/94* (2006.01)
*F01N 3/10* (2006.01)
*F01N 3/18* (2006.01)

(52) U.S. Cl. ............... 423/213.2; 60/287; 60/299
(58) Field of Classification Search ........... 423/213.2; 60/287, 299
See application file for complete search history.

(56) References Cited

U.S. PATENT DOCUMENTS

| | | | | |
|---|---|---|---|---|
| 3,273,971 A | * | 9/1966 | Baddorf et al. | 422/115 |
| 4,215,538 A | * | 8/1980 | Steinwart et al. | 60/276 |
| 5,393,499 A | | 2/1995 | Bagley et al. | 422/174 |
| 5,396,764 A | * | 3/1995 | Rao et al. | 60/274 |
| 5,587,137 A | * | 12/1996 | Swaroop et al. | 423/239.2 |
| 5,603,216 A | * | 2/1997 | Guile et al. | 60/288 |
| 5,647,203 A | * | 7/1997 | Abe et al. | 60/274 |
| 5,657,626 A | * | 8/1997 | Brown et al. | 60/274 |
| 5,934,069 A | | 8/1999 | Hertl et al. | 60/274 |
| 6,024,928 A | * | 2/2000 | Foster | 422/176 |
| 7,041,622 B2 | | 5/2006 | Nunan | 502/327 |
| 7,334,400 B2 | | 2/2008 | Yan et al. | 60/286 |
| 7,442,425 B2 | | 10/2008 | Fu et al. | 428/116 |
| 7,517,279 B2 | | 4/2009 | Kober et al. | 454/155 |
| 7,722,827 B2 | | 5/2010 | Fischer et al. | 422/168 |

FOREIGN PATENT DOCUMENTS

WO 2008/077887 7/2008

OTHER PUBLICATIONS

Hughes, K. W.; et al.. Ultra Thinwall Light-off Performance—Varying Substrates, Catalysts, and Flow Rates; Models and Engine Testing; SAE 2002-01-0352, Sae 2002 World Congress, Mar. 4-7, 2002., p. 1-12.
O.Deutschmann, et al., Detchem User Manual, Software package, 2.1 ed., www.detchem.com, Karlsruhe 2007, Sep. 25, 2007, pg. 1-144.

* cited by examiner

*Primary Examiner* — Timothy Vanoy
(74) *Attorney, Agent, or Firm* — Matthew B. McNutt

(57) ABSTRACT

A method of operating an exhaust gas after-treatment device with a substrate having a catalyst thereon directs exhaust gas through a first portion of the substrate during a cold-start of the after-treatment device, where the first portion of the substrate less than an entirety of the substrate. After light-off of the catalyst in the first portion of the substrate, exhaust gas is directed through the entirety of the substrate. An exhaust gas after-treatment device for carrying out the method includes a flow control device having a cold start configuration and a light off configuration, wherein the cold start configuration directs exhaust gas through the first portion of the substrate, and the light off configuration directs exhaust gas through the entirety of the substrate.

17 Claims, 5 Drawing Sheets

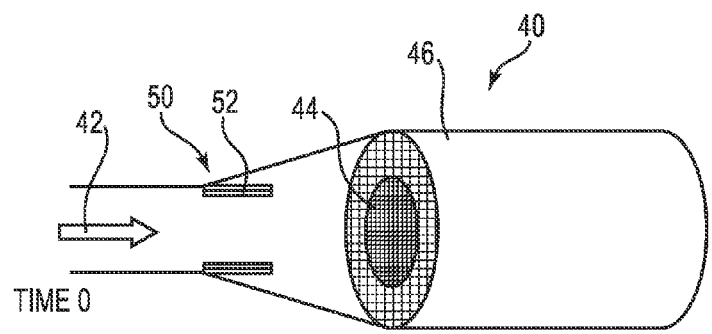
Fig. 5a
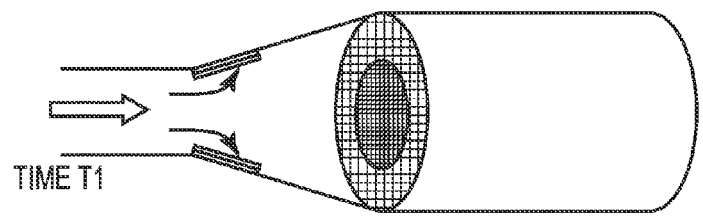
Fig. 5b
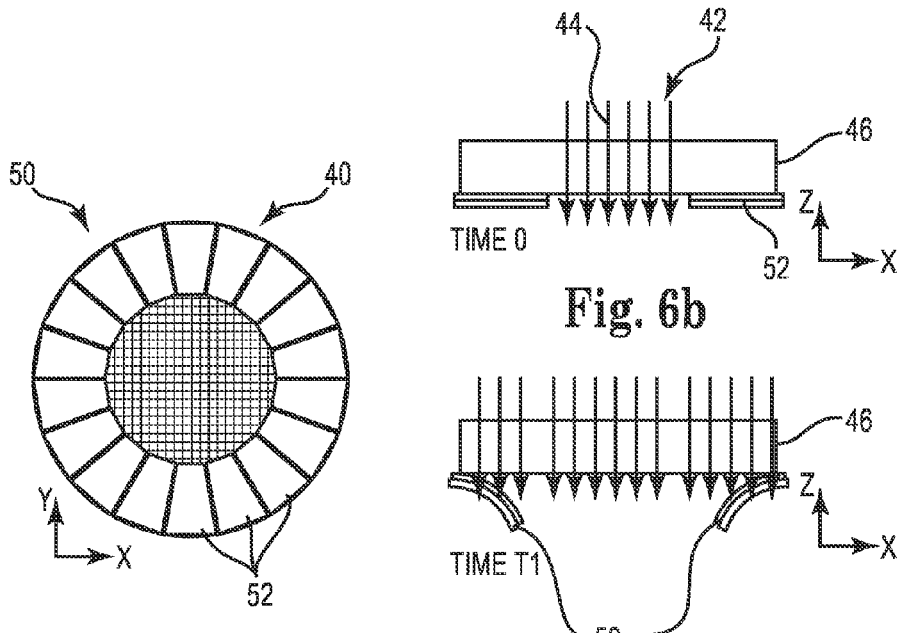
Fig. 6a
Fig. 6b
Fig. 6c

EXHAUST GAS AFTER-TREATMENT DEVICE AND METHOD OF USE

BACKGROUND

The disclosure relates generally to operation and design of monolithic reactors, and more particularly to methods of operating and designing monolithic reactors which may be used in exhaust gas after-treatment devices.

No admission is made that any reference cited herein constitutes prior art. Applicant expressly reserves the right to challenge the accuracy and pertinence of any cited documents.

Monolithic reactors in the form of honeycomb substrates incorporating catalytically active materials have been used to treat and clean exhaust gasses from automobile and truck engines for many years. Exemplary after-treatment devices for emissions control include three-way catalysts (TWC) which remove carbon monoxide (CO), hydrocarbons (HC) and nitrous oxides (NOx) from exhaust gasses. Other exemplary devices for emission control include systems that utilize selective catalytic reduction (SCR) of NOx, and diesel oxidation catalysts (DOC).

Modern exhaust gas after-treatment devices are very efficient and convert emissions to benign gases with almost 100% efficiency at high temperatures. Most of the tailpipe emissions which are not converted occur during the "cold-start" period (i.e., the first few tens of seconds during which the substrate and catalyst(s) incorporated on and/or in the substrate heat up from ambient temperature). At these low temperatures, the performance of the catalyst is limited due to reaction and mass transfer limitations.

It is accordingly important to reduce the time required to heat the after-treatment device (i.e., the substrate and catalyst(s) incorporated on and/or in the substrate) to a temperature at which polluting species are converted into benign products.

SUMMARY

One aspect of the disclosure relates to a method of operating an exhaust gas after-treatment device including a substrate having a catalyst thereon. In one embodiment, the method comprises, during a cold-start of the after-treatment device, directing exhaust gas through a first portion of the substrate, where the first portion comprising less than an entirety of the substrate. In another embodiment, after light-off of the catalyst in the first portion of the substrate, exhaust gas is directed through the entirety of the substrate. In some embodiments, the first portion of the substrate comprises less than about 45% of the entirety of the substrate, or even less than about 15% of the entirety of the substrate.

An additional aspect of the disclosure relates to an exhaust gas after-treatment device. In one embodiment, the after-treatment device comprises a honeycomb substrate having a catalytic washcoat thereon, and a flow control device configured to direct exhaust gas through the substrate. The flow control device has a cold start configuration and a light off configuration, wherein the cold start configuration directs exhaust gas through a first portion of the substrate that is less than an entirety of the substrate, and the light off configuration directs exhaust gas through the entirety of the substrate.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments. []If there are no appended drawings, amend accordingly.

BRIEF DESCRIPTION OF THE DRAWINGS

FIGS. 5a and 5b are illustrations of another embodiment of a flow control device for directing the flow of exhaust gas flow only through a central core region of the substrate during the cold start phase and through the entire substrate after light-off.

FIGS. 6a-6c are illustrations of another embodiment of a flow control device in which the flow control device is positioned downstream from the substrate.

DETAILED DESCRIPTION

Figure 1:
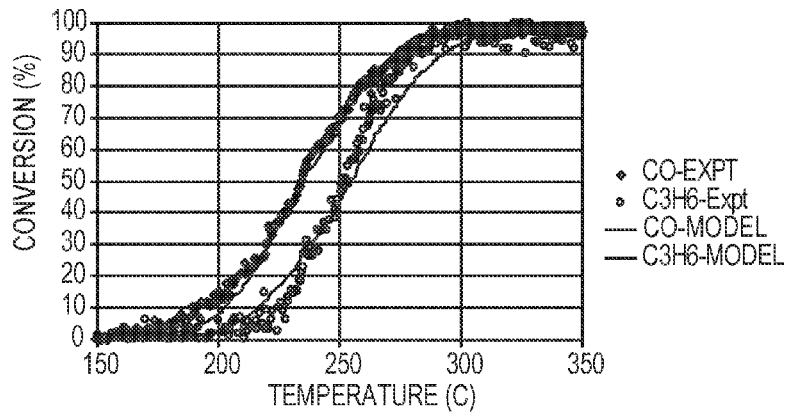
FIG. 1 is a graph illustrating experimentally determined and model-predicted CO and HC conversion performance of a three-way catalytic converter.

Methods of operating and designing after-treatment devices described herein reduce the time required to heat the after-treatment device (i.e., the substrate and catalyst(s) incorporated on and/or in the substrate) to a temperature at which polluting species are converted into benign products.

As described in greater detail below, it is shown that for fast temperature ramps from ambient temperature to high temperature (e.g., exhaust gas temperatures above about 250° C.), it is advantageous to direct the flow of exhaust gas through a limited portion of the substrate of the after-treatment device during the cold-start. This limited portion provides a lower thermal mass to be heated to the light-off temperature (as compared with the thermal mass of the entire substrate), and thereby leads to higher local temperatures and therefore higher conversion of polluting species. After light-off, the exhaust gas can be directed through the entire substrate to maximize the high-temperature performance of the after-treatment device and lower the pressure drop through the substrate.

An exhaust gas after-treatment device such as a three-way catalyst (TWC) device, selective catalytic reduction (SCR) device, or diesel oxidation catalyst (DOC) device should combine high catalytic performance (e.g., conversion of CO, HC and NOx to $CO_2$, $H_2O$ and $N_2$, respectively), low pressure drop (for engine efficiency, and fuel economy), high mechanical and thermal strengths (to survive handing, canning, vibration in use, and thermal cycles), and low cost (e.g., less catalyst loading).

Embodiments described herein exemplify methods of operation of exhaust gas after-treatment devices as may be used for controlling engine exhaust emissions. The embodiments also exemplify novel designs or configurations of after-treatment devices that enable such operation. The methods/designs described herein enable the variation of flow through different regions of the substrate to promote early light-off and thereby higher overall conversion. The methods/designs also enable more efficient utilization of structured reactors with attributes and/or functionality that varies in the radial direction. As will be discussed in greater detail below, these benefits have been confirmed by numerical simulation results. If desired or required by a particular application, the benefits of early light-off can be traded for other desired benefits, such as lower catalyst loading (thereby enabling lower cost) or lower backpressure (thereby enabling higher fuel efficiency).

Embodiments of the claimed invention are described herein primarily with reference to three-way catalyst (TWC) exhaust gas after-treatment devices, particularly with respect to the details relevant to performance predictions of the honeycomb substrate and catalyst thereon from an emissions/light-off perspective. However, it is to be understood that the principles described herein are not so limited, but rather are equally applicable to other after-treatment devices which rely on catalytic conversion of pollutants, such as selective catalytic reduction (SCR) devices and diesel oxidation catalyst (DOC) devices.

Typical exhaust gas after-treatment devices such as three-way catalysts are comprised of washcoated cellular substrates (e.g., honeycomb substrates) that convert pollutants such as CO, HC and NOx to benign products such as $CO_2$ and $H_2O$. The conversion takes place due to the reactions that occur on the catalytic sites of the washcoat. Both the transport of reacting gases to these catalytic sites as well as the catalytic reactions themselves are strongly dependent on temperature. It is therefore challenging to achieve good conversion performance at lower temperatures (i.e., ambient to ~250° C.), when the conversions are reaction rate limited.

In a typical automotive driving cycle, most of the harmful emissions (i.e., non-converted pollutants such as CO, NC, and NOx) occur during the initial heat-up phase, when the substrate and the catalytic washcoat thereon increase in temperature from ambient to operating conditions. Accordingly, there is advantage to be obtained by improving performance of after-treatment devices such as TWCs during the cold-start period. The "light-off" time (defined herein as the time it takes for the device to start converting 50% of the pollutants), is a good measure of the start-up performance of emission control devices such as TWCs. For clarity, as used herein, reference to "heating up," "temperature,"' etc., of the substrate or after-treatment device is understood to be inclusive of the catalytic washcoat present on or in the substrate. FIG. 1 illustrates CO and hydrocarbon conversion percentage as a function of temperature in a TWC, and also shows correlation of modeling predictions with experimentally obtained measurements. The experimental data in FIG. 1 was obtained using a 1 inch by 1 inch (2.54 cm by 2.54 cm) honeycomb substrate having 600 cells/$in^2$ (cpsi) and 4 mil thick cell walls (i.e., 600/4 geometry) with a three-way catalyst washcoat thereon, and exhaust gas having a space velocity of 100,000 $hr^{-1}$.

Modeling was conducted using DETCHEM software, version 2.1, available at www.detchem.com. Models included incorporation of reaction kinetics for three way catalyst (TWC) as obtained from Hughes, K. W.; Flörchinger, P. "Ultra Thinwall Light-off Performance—Varying Substrates, Catalysts, and Flow Rates; Models and Engine Testing; SAE 2002-01-0352. Material and microstructure properties were obtained by measurement of commercially available Corning Incorporated cordierite substrates to model the thermal and mass transport. The catalyst distribution was assumed to be uniform within the washcoat.

Flow rate of exhaust gas through the substrate affects the performance of the after-treatment device through: (a) the amount of heat delivered to the substrate, and (b) the residence time of the reacting gases in the substrate. Increasing the flow rate increases the heat delivered to the substrate (which is beneficial to light-off), but also reduces the residence time within the substrate (which is detrimental to light-off). The final impact of changing exhaust gas flow rates on light-off performance is therefore determined by the interplay of these opposing factors. Furthermore, heat delivered to the substrate by the exhaust gas is conducted away from the inlet end due to conduction. As a result, the local temperature of the substrate at any point is also determined by the rate of heat accumulation, which is the difference between the rate of heat delivery due to incoming hot exhaust gas and the rate of heat removal due to conduction. Therefore, the rate of heat delivery (i.e. the exhaust gas temperature ramp) also has a strong impact on the temperature response of the substrate to changes in exhaust gas flow rate. The non-intuitive result of the interplay of these factors is illustrated in FIGS. 2a and 2b where it can be seen that while light-off increases with flow rate for fast exhaust gas temperature ramps (FIG. 2a, such as seen in the FTP testing cycle), the opposite is true for slow exhaust gas temperature ramps (FIG. 2b, more typical of laboratory conditions).

Figure 2A:
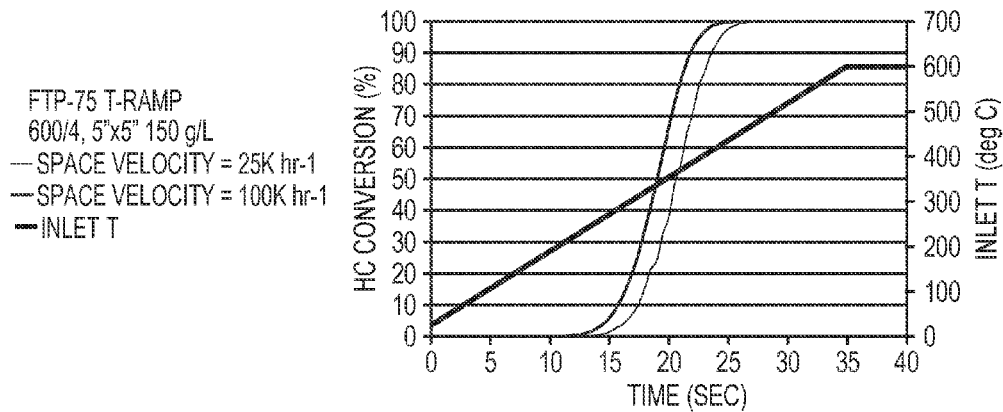
FIGS. 2a and 2b are graphs of model-predicted impact of exhaust gas space velocity on CO conversion, for varying inlet heating rates.
Figure 2B:
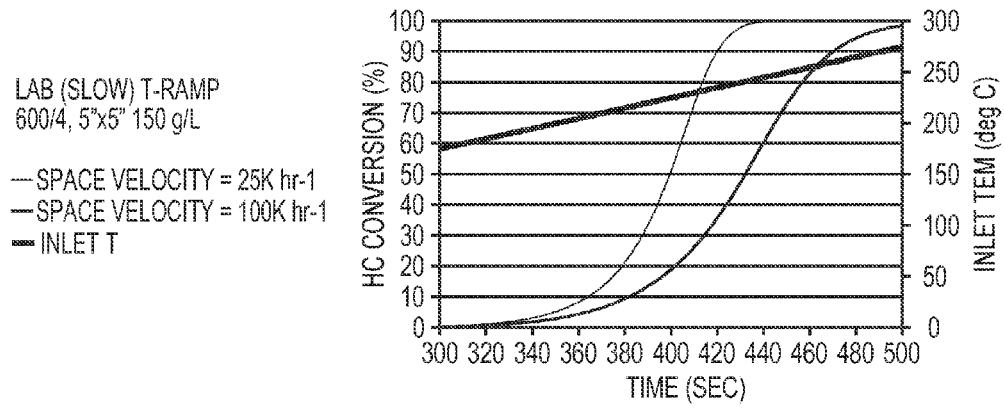

Because modern engines (e.g., gasoline direct injection or "GDI" engines) provide very fast temperature ramps, increasing exhaust gas flow rates lead to improved light-off (see, e.g., FIG. 2a). In other words, increasing the heat delivery is dominant as compared with the reduction in residence time for such temperature ramps. In this case, the local rise in temperature is restricted to near the inlet section of the substrate and any increase in flow rate leads to further increase in local temperature, which in turn is beneficial for achieving light-off. Extending this further, it can be realized that for such fast temperature ramps (e.g., exhaust gas temperature ramps greater than about 500° C./min), it is beneficial to concentrate the flow of gas (and thereby the accompanying accumulation of heat) through a smaller portion of the substrate (i.e., less than an entirety of the substrate) during the cold-start, to enable this smaller portion of the substrate to light-off more quickly.

Methods are described herein for operating an exhaust gas after-treatment device including a substrate having catalyst(s) incorporated on and/or in the substrate. According to one embodiment, a method for operating an exhaust gas after-treatment device comprises, during a cold-start of the after-treatment device (i.e., when heating from ambient temperature), directing exhaust gas through a first portion of the substrate, where the first portion comprises less than an entirety of the substrate. Then, when light-off of the catalyst has been achieved in the first portion of the substrate, directing exhaust gas through the entirety of the substrate. In one embodiment, the first portion is located substantially around the center (i.e., longitudinal axis) of the substrate. In another embodiment, the first portion is located at a position other than around the longitudinal axis of the substrate.

In exemplary embodiment, the first portion comprises less than about 45% of the substrate, less than about 30% of the substrate, or even less than about 15% of the substrate. In other embodiments, the size of the first portion is selected so as to achieve light-off in less than about 25, less than about 22 seconds, or even less than about 20 seconds. In different embodiments, the size of the first portion may be selected and optimized based on one or more of several factors, including but not limited to: (1) catalytic activity (e.g., platinum group metals load, washcoat amount, catalyst composition, aging conditions, etc.); (2) exhaust gas flow conditions (e.g., flow rate, temperature ramp); (3) substrate geometry (e.g., size, cell density, wall thickness); and (4) exhaust system design (e.g., cone near inlet to substrate).

Figure 3:
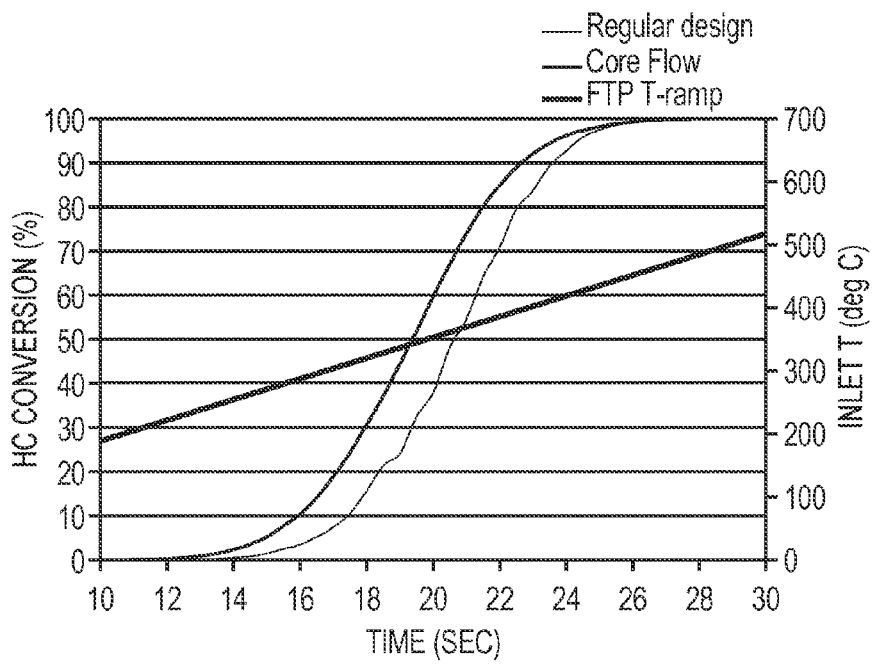
FIG. 3 is a graph comparing model-predicted hydrocarbon (HC) conversion during cold start for "core-flow" and regular substrates.

FIG. 3 illustrates numerical modeling simulations comparing hydrocarbon conversion during start up using "core flow" in which exhaust gas is directed through a limited portion of the substrate around the longitudinal axis (e.g., the longitudinal core) during startup, and "regular flow" in which exhaust gas is directed through the entirety of the substrate during startup. The simulations use the same model correlated to experimental data in FIG. 1. It is seen that the model predicts earlier light-off for the core flow" case. In FIG. 3, the model simulated a 5 inch by 5 inch (12.7 cm by 12.7 cm) honeycomb substrate having 600 cells/in$^2$ (cpsi) and 4 mil thick cell walls (i.e., 600/4 geometry) with a washcoat load of 150 g/L, and exhaust gas having a space velocity of 25,000 hr$^{-1}$.

In addition to improving light-off by changing the flow of exhaust gas through the substrate during cold-start, further benefit may be obtained by tailoring the substrate geometry (e.g., cell density, channel size, wall thickness), microstructure (e.g. porosity, pore size distribution), and/or material properties (e.g. thermal conductivity) in the first portion of the substrate to further improve cold-start emissions performance. For example, in some embodiments, the first portion of the substrate is provided with increased cell density and/or decreased wall thickness. In some embodiments, the cell density and/or wall thickness of the substrate varies radially.

In other embodiments, the first portion of the substrate may be wash coated differently (e.g., such as with different catalyst formulations or loadings, or a hydrocarbon adsorber to trap hydrocarbons associated with cold-start) to further enhance the functionality of the device.

Embodiments of flow delivery systems for directing of exhaust flow only through a limited portion of the substrate (e.g., the central core portion) during the cold start phase are described herein. The embodiments described are exemplary only, and are not intended to be exhaustive.

Figure 4A:
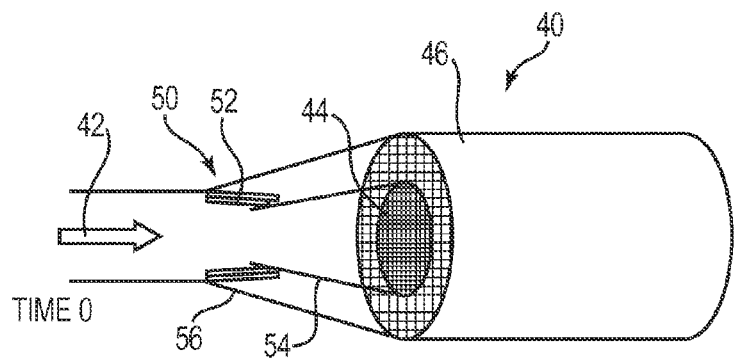
FIGS. 4a and 4b are schematic illustrations of one embodiment of a flow control device for directing the flow of exhaust gas flow only through a central core region of the substrate during the cold start phase and through the entire substrate after light-off.
Figure 4B:
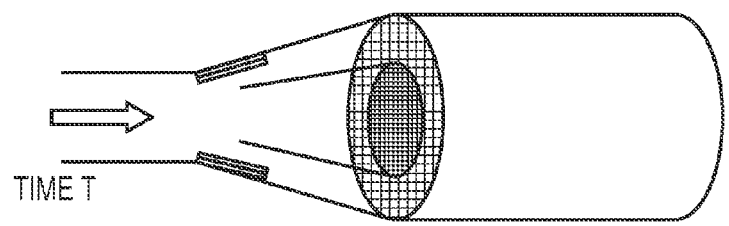

FIGS. 4a and 4b schematically illustrates one embodiment of an after-treatment device 40 configured to direct or concentrate the flow of exhaust gas 42 through a first portion 44 of the substrate 46, where first portion 44 comprises less than an entirety of the substrate 44 during cold start (FIG. 4a) and then, after light-off is achieved, directing the flow of exhaust gas 42 through the entirety of the substrate 46 (FIG. 4b). The embodiment of FIG. 4 illustrates a flow control device 50 comprising a valve system in which, during start up, mechanisms 52 move or change position to allow exhaust gas 42 to flow only through the first portion 44 of the substrate 46 (the flow control device 50 cold start configuration). In the illustrated embodiment, first portion 44 is substantially aligned with a central core portion of substrate 46. After light off, the mechanisms 52 are opened to allow exhaust gas 42 to flow through the entire substrate 46 (the flow control device 50 light off configuration).

In one implementation of the embodiment of FIGS. 4a and 4b, the mechanisms 52 comprise automatic or self-adjusting mechanisms, such as bimetallic plates that change shape with temperature. Such self-adjusting mechanisms 52 are provided to manipulate and change the flow of exhaust gas 42 over time. As shown in FIG. 4a, at an initial time, T0, the bimetallic plates (i.e., mechanisms 52) are at ambient temperature and have a first shape (e.g., generally straight in the illustrated embodiment of FIG. 4a) and direct the flow of exhaust gas 42 through a first pipe 54 that concentrates and directs the exhaust gas 42 through the first portion 44 of the substrate 46 (e.g., along the core of the substrate 46 in the illustrated embodiment). As exhaust gas 42 flows past and heats the plates, the plates change to a different second shape (e.g., bend or curved in the illustrated embodiment of FIG. 4b) at a later second Time T1 such that exhaust gas 42 is allowed to additionally pass through a second pipe 56 and thereby flow generally through the entirety of the substrate 46, so that the exhaust gas 42 is no longer concentrated at the limited first portion 44 of substrate 46.

Referring now to FIGS. 5a and 5b, another embodiment of a flow control device 50' is illustrated. In the embodiment of FIGS. 5a and 5b, automatic or self-adjusting mechanisms 52, such as bimetallic plates as described above, are provided to manipulate and change the flow of exhaust gas 42 over time. At an initial time, T0, the mechanisms 52 are at ambient temperature and have a first shape (e.g., generally straight in the illustrated embodiment of FIG. 5a) that concentrates and directs the exhaust gas 42 generally at the first portion 44 of the substrate 44 (the flow control device 50 cold start configuration). As exhaust gas 42 flows past and heats the mechanisms 52, they change to a different second shape (e.g., bent or curved the in illustrated embodiment) at a later second Time T1 such that exhaust gas 42 is generally directed through the entirety of the substrate 46, and is no longer concentrated at the limited first portion 44 of the substrate (the flow control device 50 light off configuration).

FIGS. 4 and 5 illustrate the flow distribution device 50 as positioned in front of (i.e., upstream from) the substrate 46, either for switching the flow of exhaust gas 42 between two pipes (FIG. 4) or just for changing the nozzle shape (FIG. 5) provided by the device. In other embodiments, the flow distribution device 50 could be located after (i.e., downstream from) the substrate 46 (FIG. 6).

One embodiment of an after-treatment device 40 with a flow distribution device 50 located after the substrate 46 is illustrated in FIGS. 6a-6c. In one exemplary embodiment, mechanisms 52 are bimetallic plates (operating as described above) positioned and arranged in a petal-like configuration (FIG. 6a). Initially, at cold start the plates have a straight shape to create additional pressure drop at the perimeter of substrate 46 (FIG. 6b, time T0) and thereby force the exhaust gas 42 mostly through a limited portion of the substrate (i.e, first portion 44). During the heating up process, the temperature of the plates increases and the plates thus change to a second, e.g., bended, shape (FIG. 6c, time T1). The pressure drop at the substrate perimeter decreases as the plates bend, and the flow of exhaust gas 42 expands radially toward the perimeter until gas flows through the entirety of the substrate 46 more uniformly.

Figure 7:
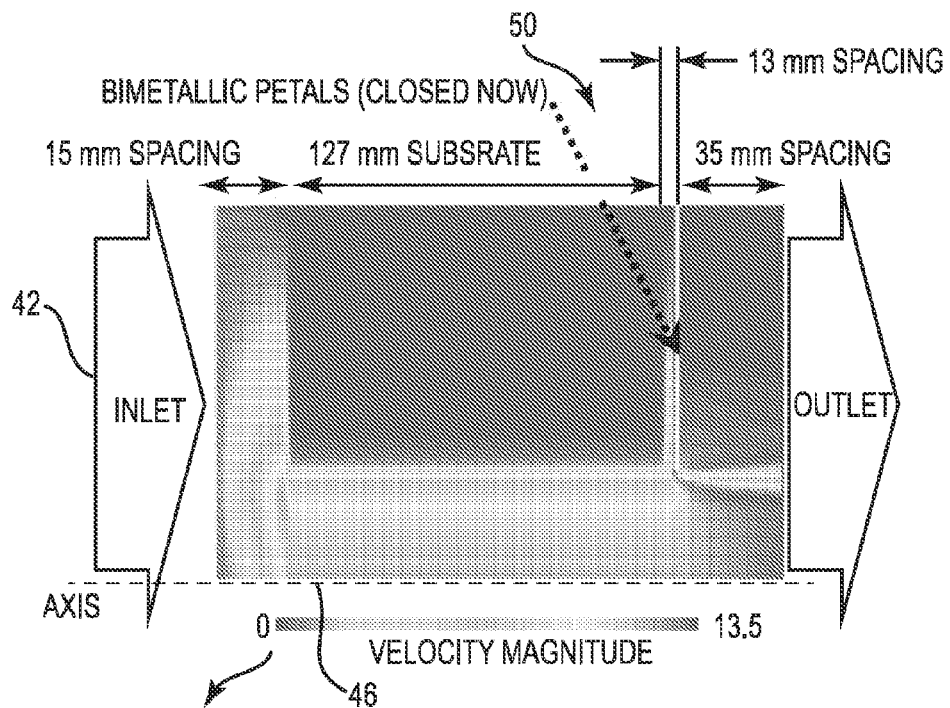
FIG. 7 is a graphical representation of the flow uniformity through a substrate in which the flow control device of FIG. 6 is used, where the flow control petals cover 70% of the substrate radius.

The distribution of exhaust gas 42 through the substrate 46 resulting from pressure losses induced by the shape and location of the plates may be estimated using a 2D axi-symmetry FLUENT model. Referring to FIG. 7, the computed fluid flow through a 127 mm long substrate is shown. In the figure, at the inlet side, there is a 15 mm spacing in front of the substrate. A flow distribution device 50 comprising petals as described with reference to FIG. 6 are positioned 3 mm downstream from the outlet of the substrate 46. In FIG. 7, the petals cover 70% of the substrate radius.

Figure 8:
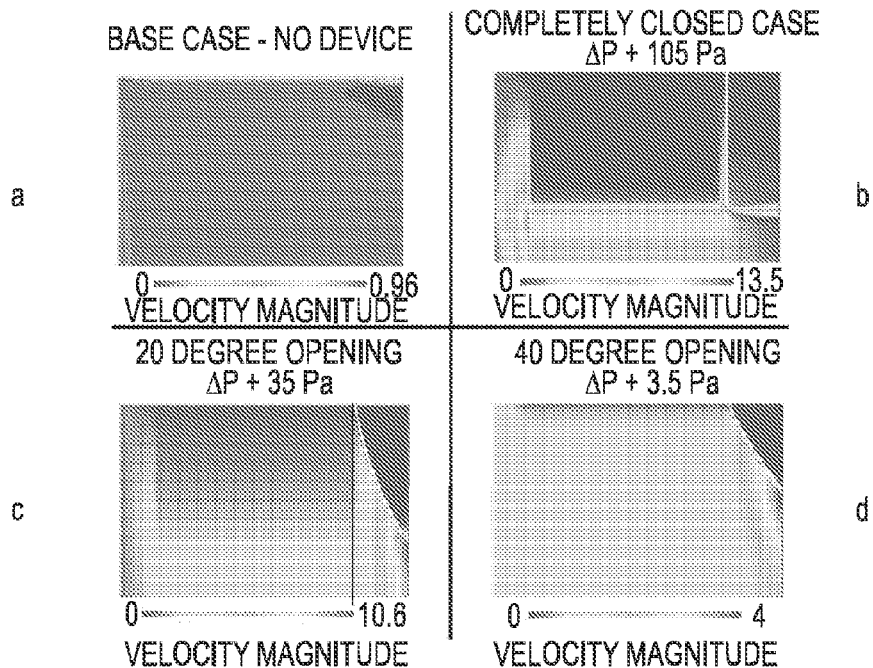
FIGS. 8a-8d are a graphical representations of the flow uniformity through a substrate in which the flow control device of FIG. 6 is used, for four different petal configurations: no petals (FIG. 8a), completely closed petals (FIG. 8b), 20 degree reopened petals (FIGS. 8c), and 40 degree reopened petals(FIG. 8d).

In FIG. 8, four different geometries are modeled: 1) no petals (FIG. 8a), 2) completely closed petals (FIG. 8b), 3) petals 20° open (FIGS. 8c), and 4) petals 40° open (FIG. 8d). It can be seen that in the case of completely closed petals (FIG. 8b) most of the exhaust gas goes through the center of the substrate. Modeling shows that the pressure drop in the case with completely closed petals (FIG. 8b) is about is ~40% greater (105 Pa in the modeled example) than the case with no petals (FIG. 8a). However, this increase in backpressure only exists during the first few seconds of engine operation, and then reduces quickly as the petals move to the open position. As seen in FIG. 8d, the pressure drop with open petals is only about 3.5 Pa greater than the case with no petals (FIG. 8a) in the modeled example. In most applications, this additional pressure drop (during cold start and thereafter) is negligible.

Figure 9:
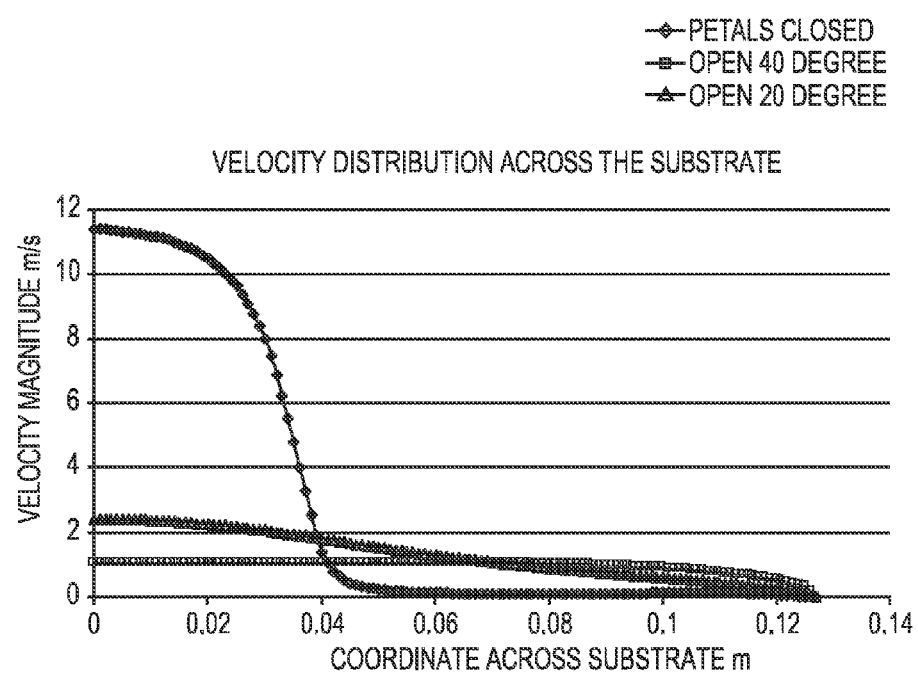
FIG. 9 is a graph illustrating the effect of petal reopening on velocity distribution across the substrate.

FIG. 9 shows the effect of petal reopening (from the completely closed position) on the exhaust gas velocity distribution across the substrate. It can be seen that when the petals are completely closed most of the exhaust gas goes through the center of substrate. In the case of 40° degree petal reopening, nearly uniform velocity distribution is achieved across the substrate.

As described herein, directing flow through a limited portion of the substrate during the cold start provides numerous benefits. Benefits include reduced light-off time, which leads to reduced overall emissions. The reduced light-off time can be traded for other benefits such as reduced backpressure or reduced catalyst loading (which may enable a lower cost device). In some embodiments, reduced hydrocarbon emissions may be realized via preferentially coating the substrate with hydrocarbon adsorbing material in the region through which flow is directed in the cold start condition. In some embodiments, reduced emissions may be achieved by providing the substrate with radially varying attributes, such as by providing increased cell density in the region of the substrate through which flow is directed in the cold start condition. Such embodiments may provide similar or better emissions reduction at reduced backpressure as compared to products with high cell density across the entire substrate.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of operating an exhaust gas after-treatment device including a substrate having a catalyst thereon, the method comprising:
during a cold-start of the after-treatment device, directing exhaust gas through a first portion of the substrate, the first portion comprising less than an entirety of the substrate.

2. The method of claim 1, further comprising:
after light-off of the catalyst in the first portion of the substrate, directing exhaust gas through the entirety of the substrate.

3. The method of claim 2, wherein directing exhaust gas through a first portion of the substrate comprises directing exhaust gas through less than about 45% of the entirety of the substrate.

4. The method of claim 3, wherein directing exhaust gas through a first portion of the substrate comprises directing exhaust gas through less than about 15% of the entirety of the substrate.

5. The method of claim 2, wherein directing exhaust gas through the entirety of the substrate begins when about 50% of the pollutants in the exhaust gas are converted by the catalytic washcoat.

6. The method of claim 2, further comprising: adjusting a flow control device from a cold-start configuration in which exhaust gas is directed through the first portion of the substrate, to a light-off configuration in which exhaust gas is directed through the entirety of the substrate.

7. The method of claim 1, wherein during cold start the exhaust gas has a temperature ramp greater than about 500° C./min.

8. The method of claim 6, wherein adjusting the flow control device comprises changing the shape of the flow control device as a temperature of the flow control device changes.

9. An exhaust gas after-treatment device comprising:
a honeycomb substrate having a catalytic washcoat thereon;
a flow control device configured to direct exhaust gas through the substrate, the flow control device having a cold start configuration and a light off configuration, wherein the cold start configuration directs exhaust gas through a first portion of the substrate that is less than an entirety of the substrate, and the light off configuration directs exhaust gas through the entirety of the substrate.

10. The exhaust gas after-treatment device of claim 9, wherein the cold start configuration directs exhaust gas through less than 45% of the entirety of the substrate.

11. The exhaust gas after-treatment device of claim 9, wherein the cold start configuration directs exhaust gas through less than 15% of the entirety of the substrate.

12. The exhaust gas after-treatment device of claim 9, wherein the flow control device is positioned upstream from the substrate.

13. The exhaust gas after-treatment device of claim 9, wherein the flow control device is positioned downstream from the substrate.

14. The exhaust gas after-treatment device of claim 9, wherein the flow control device is configured to transition from the cold start configuration to the light off configuration when about 50% of the pollutants in the exhaust gas are converted by the catalytic washcoat.

15. The exhaust gas after-treatment system of claim 9, wherein during cold start the exhaust gas has a temperature ramp greater than about 500° C./min.

16. The exhaust gas after-treatment system of claim 9, wherein the flow control device comprises mechanisms that change shape with temperature.

17. The exhaust gas after-treatment system of claim 16, wherein the flow control device comprises bimetal plates.

* * * * *